US011924928B2

(12) United States Patent
Gavrielov et al.

(10) Patent No.: US 11,924,928 B2
(45) **Date of Patent: *Mar. 5, 2024**

(54) CARTRIDGE AND E-VAPING DEVICE

(71) Applicant: Altria Client Services LLC, Richmond, VA (US)

(72) Inventors: Shmuel Gavrielov, Beit Shemesh (IL); Yuval Malka, Richmond, VA (US); Rangaraj S. Sundar, Midlothian, VA (US); Isaac Weigensberg, Richmond, VA (US); David Rubli, Revava (IL); Moshe Eliyahu, Beit Shemesh (IL); Arye Weigensberg, Richmond, VA (US); Christopher S. Tucker, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/178,003

(22) Filed: Mar. 3, 2023

(65) Prior Publication Data

US 2023/0209660 A1 Jun. 29, 2023

Related U.S. Application Data

(63) Continuation of application No. 17/838,749, filed on Jun. 13, 2022, now Pat. No. 11,602,017, which is a
(Continued)

(51) Int. Cl.
*H05B 3/12* (2006.01)
*A24F 40/42* (2020.01)
(Continued)

(52) U.S. Cl.
CPC ............... *H05B 3/12* (2013.01); *A24F 40/42* (2020.01); *A24F 40/44* (2020.01); *H05B 3/42* (2013.01);
(Continued)

(58) Field of Classification Search
CPC ... H05B 3/12; H05B 3/42; H05B 3/44; H05B 2203/003; H05B 2203/021; A24F 40/44; A24F 40/42
See application file for complete search history.

(56) References Cited

U.S. PATENT DOCUMENTS 3,136,592 A 6/1964 Miller
3,200,819 A 8/1965 Gilbert
(Continued)

FOREIGN PATENT DOCUMENTS

CN 1122213 A 5/1996
CN 2634369 Y 8/2004
(Continued)

OTHER PUBLICATIONS

Office Action dated Feb. 22, 2023 issued in related Japanese patent application No. 2020-536975.
(Continued)

*Primary Examiner* — Tho D Ta
(74) *Attorney, Agent, or Firm* — Harness, Dickey & Pierce, P.L.C.

(57) ABSTRACT

A cartridge of an e-vaping device includes a housing extending in a longitudinal direction, a reservoir in the housing, a heater in the housing, and an absorbent material at least partially surrounding the sinusoidal shaped member. The reservoir is configured to store a pre-vapor formulation. The heater has a sinusoidal shaped member translating about an elliptical shape to define a channel there through. The absorbent material is in fluid communication with the reservoir.

11 Claims, 12 Drawing Sheets

Related U.S. Application Data continuation of application No. 17/110,636, filed on Dec. 3, 2020, now Pat. No. 11,363,681, which is a continuation of application No. 16/840,617, filed on Apr. 6, 2020, now Pat. No. 10,881,151, which is a continuation of application No. 16/456,378, filed on Jun. 28, 2019, now Pat. No. 10,786,004, which is a continuation of application No. 16/106,220, filed on Aug. 21, 2018, now Pat. No. 10,342,265, which is a continuation of application No. 15/862,823, filed on Jan. 5, 2018, now Pat. No. 10,143,239, which is a continuation-in-part of application No. 15/224,866, filed on Aug. 1, 2016, now Pat. No. 10,051,894.

(51) Int. Cl.

| | |
|---|---|
| ***A24F 40/44*** | (2020.01) |
| ***H05B 3/42*** | (2006.01) |
| ***H05B 3/44*** | (2006.01) |
| *A24F 40/10* | (2020.01) |
| *A24F 40/60* | (2020.01) |

(52) U.S. Cl.

CPC ................ *H05B 3/44* (2013.01); *A24F 40/10* (2020.01); *A24F 40/60* (2020.01); *H05B 2203/003* (2013.01); *H05B 2203/021* (2013.01)

(56) References Cited

U.S. PATENT DOCUMENTS

| | | | | |
|---|---|---|---|---|
| 4,361,374 | A | 11/1982 | Marmillion et al. | |
| 5,388,594 | A | 2/1995 | Counts et al. | |
| 5,530,225 | A | 6/1996 | Hajaligol | |
| 5,573,692 | A | 11/1996 | Das et al. | |
| 5,591,368 | A | 1/1997 | Fleischhauer et al. | |
| 5,649,554 | A | 7/1997 | Sprinkel et al. | |
| 5,750,964 | A | 5/1998 | Counts et al. | |
| 5,878,752 | A | 3/1999 | Adams et al. | |
| 6,688,313 | B2 | 2/2004 | Wrenn et al. | |
| 7,104,826 | B2 | 9/2006 | Zahlit et al. | |
| 7,988,479 | B2 | 8/2011 | Hankins et al. | |
| 8,910,641 | B2 | 12/2014 | Hon | |
| 9,055,617 | B2 | 6/2015 | Thorens et al. | |
| 9,084,440 | B2 | 7/2015 | Zuber et al. | |
| 9,226,526 | B2 | 1/2016 | Liu | |
| 9,271,529 | B2 | 3/2016 | Alima | |
| 9,277,770 | B2 | 3/2016 | DePiano et al. | |
| 9,320,300 | B2 | 4/2016 | Hon | |
| 9,480,286 | B2 | 11/2016 | Liu | |
| 9,491,974 | B2 | 11/2016 | DePiano et al. | |
| 9,497,994 | B2 | 11/2016 | Liu | |
| 9,532,605 | B2 | 1/2017 | Yamada et al. | |
| 10,051,894 | B2 | 8/2018 | Gavrielov et al. | |
| 10,143,239 | B2 | 12/2018 | Gavrielov et al. | |
| 10,285,450 | B2 | 5/2019 | Gavrielov et al. | |
| 10,342,265 | B2 | 7/2019 | Gavrielov et al. | |
| 10,786,005 | B2 | 9/2020 | Gavrielov et al. | |
| 10,881,151 | B2 * | 1/2021 | Gavrielov | A24F 40/44 |
| 11,197,500 | B2 | 12/2021 | Gavrielov et al. | |
| 11,363,681 | B2 | 6/2022 | Gavrielov et al. | |
| 2011/0309157 | A1 | 12/2011 | Yang et al. | |
| 2013/0192615 | A1 | 8/2013 | Tucker et al. | |
| 2013/0192623 | A1 | 8/2013 | Tucker et al. | |
| 2013/0306082 | A1 | 11/2013 | Sherwood et al. | |
| 2014/0123989 | A1 | 5/2014 | LaMothe | |
| 2014/0130796 | A1 | 5/2014 | Liu | |
| 2014/0150785 | A1 | 6/2014 | Malik et al. | |
| 2014/0182610 | A1 * | 7/2014 | Liu | A24F 40/42 131/329 |
| 2014/0260398 | A1 | 9/2014 | Kozubal et al. | |
| 2014/0261408 | A1 | 9/2014 | DePiano et al. | |
| 2014/0261492 | A1 | 9/2014 | Kane et al. | |
| 2014/0270730 | A1 | 9/2014 | DePiano et al. | |
| 2014/0332019 | A1 | 11/2014 | Liu | |
| 2015/0027456 | A1 | 1/2015 | Janardhan et al. | |
| 2015/0027457 | A1 | 1/2015 | Janardhan et al. | |
| 2015/0027469 | A1 | 1/2015 | Tucker et al. | |
| 2015/0027471 | A1 | 1/2015 | Feldman et al. | |
| 2015/0208731 | A1 | 7/2015 | Malamud et al. | |
| 2015/0305408 | A1 | 10/2015 | Liu | |
| 2015/0335073 | A1 | 11/2015 | Li et al. | |
| 2016/0021930 | A1 | 1/2016 | Minskoff et al. | |
| 2016/0073692 | A1 | 3/2016 | Alarcon et al. | |
| 2016/0106153 | A1 | 4/2016 | Zhu | |
| 2016/0109115 | A1 | 4/2016 | Lipowicz | |
| 2016/0120225 | A1 | 5/2016 | Mishra et al. | |
| 2016/0135505 | A1 | 5/2016 | Li et al. | |
| 2016/0157522 | A1 | 6/2016 | Zhu | |
| 2016/0192615 | A1 | 7/2016 | Parness | |
| 2016/0332754 | A1 | 11/2016 | Brown et al. | |
| 2016/0374393 | A1 | 12/2016 | Chen | |
| 2017/0150753 | A1 | 6/2017 | Macko | |
| 2017/0233114 | A1 | 8/2017 | Christensen et al. | |
| 2017/0354181 | A1 | 12/2017 | Fornarelli | |
| 2018/0007962 | A1 | 1/2018 | Hunt et al. | |
| 2018/0007966 | A1 | 1/2018 | Li et al. | |
| 2019/0276204 | A1 | 9/2019 | McKeon et al. | |

FOREIGN PATENT DOCUMENTS

| | | | |
|---|---|---|---|
| CN | 103315403 | A | 9/2013 |
| CN | 103974639 | A | 8/2014 |
| CN | 104023775 | A | 9/2014 |
| CN | 204146320 | U | 2/2015 |
| CN | 204273230 | U | 4/2015 |
| CN | 105578913 | A | 5/2016 |
| CN | 106998811 | A | 8/2017 |
| EP | 2941969 | A1 | 11/2015 |
| EP | 2952109 | A1 | 12/2015 |
| EP | 3039974 | A1 | 7/2016 |
| JP | 2015-504652 | A | 2/2015 |
| JP | 2015-527884 | A | 9/2015 |
| JP | 2016-511008 | A | 4/2016 |
| JP | 2016/0157522 | A | 9/2016 |
| JP | 2019-501645 | A | 1/2019 |
| KZ | 31683 | B | 12/2016 |
| RU | 2132629 | C1 | 7/1999 |
| RU | 2608689 | C1 | 1/2017 |
| RU | 2627002 | C2 | 8/2017 |
| WO | WO-2014/012894 | A1 | 1/2014 |
| WO | WO-2014/110740 | A1 | 7/2014 |
| WO | WO-2014/150979 | A2 | 9/2014 |
| WO | WO-2015/046387 | A1 | 4/2015 |
| WO | WO-2015/078147 | A1 | 6/2015 |
| WO | WO-2016034157 | A1 | 3/2016 |
| WO | WO-2016/061166 | A1 | 4/2016 |
| WO | WO-2016/092261 | A1 | 6/2016 |
| WO | WO-2016/095220 | A1 | 6/2016 |

OTHER PUBLICATIONS

International Search Report for corresponding International Application No. PCT/EP2017/069469 dated Oct. 4, 2017.

Non-Final Office Action dated Feb. 6, 2018 issued in U.S. Appl. No. 15/862,823.

Non-Final Office Action dated Aug. 23, 2017 issued in U.S. Appl. No. 15/224,866.

Notice of Allowance dated Dec. 26, 2017 issued in U.S. Appl. No. 15/224,866.

Non-Final Office Action for U.S. Appl. No. 16/053,313 dated Aug. 31, 2018.

Non-Final Office Action for U.S. Appl. No. 16/106,220 dated Sep. 14, 2018.

U.S. Office Action for corresponding U.S. Appl. No. 16/106,220 dated Sep. 14, 2018.

U.S. Office Action for corresponding U.S. Appl. No. 16/053,313 dated Aug. 31, 2018.

Partial International Search Report for Application No. PCT/EP2018/086901 dated Apr. 11, 2019.

United States Office Action for corresponding U.S. Appl. No. 16/410,199, dated May 28, 2019.

(56) References Cited

OTHER PUBLICATIONS

United States Notice Of Allowance for U.S. Appl. No. 16/410,199, dated Jul. 8, 2019.
International Search Report and Written Opinion for corresponding Application No. PCT/EP2018/086901, dated Jul. 19, 2019.
United States Office Action for U.S. Appl. No. 16/456,378, dated Sep. 26, 2019.
United States Notice of Allowance for U.S. Appl. No. 16/410,199, dated Oct. 17, 2019.
United States Notice of Allowance for U.S. Appl. No. 16/456,378, dated Jan. 8, 2020.
United States Notice of Allowance for U.S. Appl. No. 16/410,199, dated Feb. 13, 2020.
International Preliminary Report on Patentability for corresponding Application No. PCT/EP2018/086901, dated Mar. 10, 2020.
United States Office Action for U.S. Appl. No. 16/840,617, dated Apr. 24, 2020.
United States Notice of Allowance for U.S. Appl. No. 16/456,378, dated May 29, 2020.
United States Notice of Allowance for U.S. Appl. No. 16/747,172, dated Jun. 1, 2020.
United States Notice of Allowance for U.S. Appl. No. 16/410,199, dated Jun. 1, 2020.
United States Notice of Allowance for U.S. Appl. No. 16/840,617, dated Aug. 19, 2020.
Russian Office Action and Search Report dated Oct. 29, 2020 for corresponding Russian Application No. 2019105565, and English-language translation thereof.
Russian Notice of Allowance dated Mar. 17, 2021 for corresponding Russian Application No. 2018105565, and Engish-language translation thereof.
Chinese Office Action dated Mar. 18, 2021 for corresponding Chinese Application No. 201780042411.9, and English-language translation thereof.
U.S. Notice of Allowance dated Jul. 19, 2021 for corresponding U.S. Appl. No. 17/018,211.
Japanese Office Action dated Jun. 14, 2021 for corresponding Japanese Application No. 2019-505487, and English-language translation thereof.
European Communication dated Jul. 21, 2021 for corresponding European Application No. 18833670.5.
Israeli Office Action dated Sep. 13, 2021 for corresponding Israeli Application No. 263441, and English-language translation thereof.
U.S. Notice of Allowance dated Feb. 3, 2022 for corresponding U.S. Appl. No. 17/110,636.
Chinese Office Action dated Jan. 11, 2022 for corresponding Chinese Application No. 201780042411.9, and English-language translation thereof.
Russian Office Action and Search Report dated Dec. 27, 2021 for corresponding Russian Application No. 2020125854, and English-language translation thereof.
Japanese Office Action and English translation thereof dated Mar. 14, 2022.
European Intention to Grant dated Mar. 13, 2022.
Israeli Notice of Allowance dated Jan. 23, 2022.
Russian Notice of Allowance dated May 19, 2022 for corresponding Russian Application No. 2020125854, and English-language translation thereof.
U.S. Office Action dated Oct. 25, 2021 for corresponding U.S. Appl. No. 17/110,636.
Chinese Office Action dated Jun. 13, 2022 for corresponding Chinese Application No. 201780042411.9, and English-language translation thereof.
Brazilian Office Action dated Aug. 9, 2022 for corresponding Brazilian Application No. 1120200112224, and English-language translation thereof.
U.S. Notice of Allowance dated Oct. 6, 2022 for corresponding U.S. Appl. No. 17/519,980.
U.S. Notice of Allowance dated Oct. 21, 2022 for corresponding U.S. Appl. No. 17/838,749.
Chinese Office Action dated Oct. 10, 2022 for corresponding Chinese Application No. 201780042411.9.
U.S. Notice of Allowance dated Nov. 17, 2022 for corresponding U.S. Appl. No. 17/519,980.
Korean Office Action dated Oct. 27, 2022 for corresponding Korean Application No. 10- 2019-7001572, and English-language translation thereof.
Notice of Allowance dated Aug. 24, 2023 issued in related Japanese patent application No. 2022-112875.
Notice of Allowance dated Sep. 7, 2023 issued in related Chinese patent application No. 201880080495.X.
Office Action dated Jun. 27, 2023 issued in related Korean patent application No. 10-2019-7001572.
Notice of Allowance dated Sep. 27, 2023 issued in related U.S. Appl. No. 18/182,679.
Office Action dated Oct. 12, 2023 issued in related Canadian patent application No. 3028378.
Notice of Allowance dated Dec. 14, 2023 issued in related Korean patent application No. 2019-7001572.

* cited by examiner

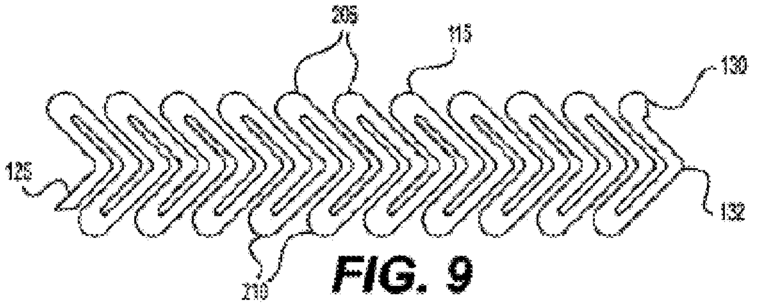
FIG. 9
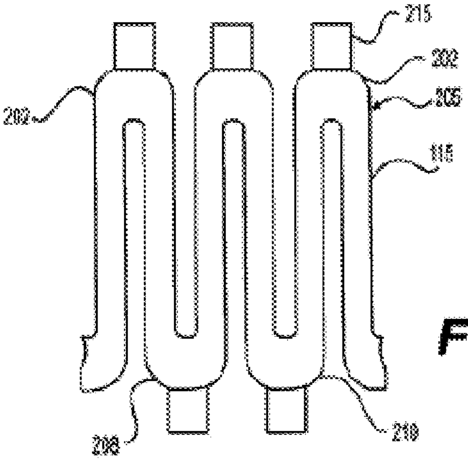
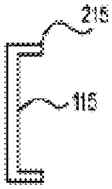
FIG. 10B
FIG. 10A

CARTRIDGE AND E-VAPING DEVICE

CROSS-REFERENCE TO RELATED APPLICATION

This application is a continuation of U.S. application Ser. No. 17/838,749, filed Jun. 13, 2022, which is a continuation of U.S. application Ser. No. 17/110,636, filed Dec. 3, 2020, which is a continuation of U.S. application Ser. No. 16/840,617, filed Apr. 6, 2020, which is a continuation of U.S. application Ser. No. 16/456,378, filed Jun. 28, 2019, which is a continuation of U.S. application Ser. No. 16/106,220, filed Aug. 21, 2018 which is a continuation of U.S. application Ser. No. 15/862,823, filed Jan. 5, 2018, which is a continuation-in-part of U.S. application Ser. No. 15/224,866, filed Aug. 1, 2016, the entire contents of each of which is hereby incorporated by reference.

BACKGROUND

Field

The present disclosure relates to a serpentine heater and a cartridge of an electronic vaping or e-vaping device configured to deliver a pre-vapor formulation to a vaporizer.

Description of Related Art

An e-vaping device includes a heater element which vaporizes a pre-vapor formulation to produce a "vapor."

The e-vaping device includes a power supply, such as a rechargeable battery, arranged in the device. The battery is electrically connected to the heater, such that the heater heats to a temperature sufficient to convert the pre-vapor formulation to a vapor. The vapor exits the e-vaping device through a mouthpiece including at least one outlet.

SUMMARY

At least one example embodiment relates to a cartridge of an e-vaping device.

In at least one example embodiment, the cartridge comprises a housing extending in a longitudinal direction; a reservoir in the housing, the reservoir configured to store a pre-vapor formulation; a first connector piece defining a first channel extending therethrough; a post extending through the first channel, the post defining a second channel therethrough; a heater in the housing; and an absorbent material. The heater includes a first ring at a first end of the heater, a second ring at a second end of the heater, and a sinusoidal shaped member extending between the first ring and the second ring. The first ring, the sinusoidal shaped member, and the second ring are integrally formed. The second end of the tubular heater is within and connected to a portion of the post that at least partially surrounds the sinusoidal shaped member. The absorbent material at least partially surrounds the sinusoidal shaped member. The absorbent material is in fluid communication with the reservoir.

In at least one example embodiment, the cartridge further includes a sheath integrally formed with an inner tube. The sheath at least partially surrounds the absorbent material. The sheath includes an end wall. The end wall includes at least one weep hole through the end wall. The absorbent material is in fluid communication with the reservoir via the at least one weep hole.

In at least one example embodiment, the sheath is formed of an electrically conductive material. In at least one example embodiment, the first end of the heater is in contact with a portion of the sheath. In at least one example embodiment, the sheath is electrically insulated from the post.

In at least one example embodiment, the housing comprises: an end wall that is integrally formed with the housing. The end wall includes a channel therethrough. The channel is in fluid communication with an air channel extending through the inner tube.

In at least one example embodiment, the cartridge further includes a mouthpiece configured to fit over a first end of the housing. The mouthpiece includes at least one outlet in fluid communication with the channel in the end wall.

In at least one example embodiment, the cartridge further comprises a cylindrical member extending through the first connector piece. The cylindrical member is electrically isolated from the post. The cylindrical member is formed of a conductive material, and the cylindrical member is in contact with at least a portion of the sheath.

In at least one example embodiment, the housing comprises a support tube attached to an inner wall of the housing by at least two fins. Spaces between the fins form part of the reservoir.

In at least one example embodiment, a first end of the inner tube fits with an end portion of the support tube.

In at least one example embodiment, the absorbent material comprises a hollow, cylinder of absorbent material. The absorbent material comprises glass fiber.

At least one example embodiment relates to a cartridge of an e-vaping device.

In at least one example embodiment, a cartridge of an e-vaping device comprises a housing extending in a longitudinal direction; a reservoir in the housing, the reservoir configured to store a pre-vapor formulation; an inner tube in the outer housing, the reservoir between an inner surface of the housing and an outer surface of the inner tube, the inner tube defining an air channel therein; a sheath integrally formed with the inner tube, the sheath having an end wall and a lateral wall, the sheath defining a heating chamber therein, the sheath defining an air passage through the end wall, and the air passage in fluid communication with the air channel; a gasket within the sheath, the gasket including a base portion and an elongate portion, the base portion friction fitted within the sheath and the elongate portion extending out of the sheath; a heating coil in the heating chamber; a wick in contact with the heating coil; and an absorbent material surrounding a portion of the elongate portion of the gasket.

In at least one example embodiment, the absorbent material is within the sheath, and the wick in contact with the absorbent material.

In at least one example embodiment, the gasket defines two holes through the base portion. The cartridge further comprises: a first electrical lead; and a second electrical lead. Each of the first electrical lead and the second electrical lead extend through one of the two holes through the base portion of the gasket.

In at least one example embodiment, the gasket defines at least one flow passage through the base portion and the elongate portion. The at least one channel in fluid communication with the air passage and the air channel.

In at least one example embodiment, the gasket defines at least one notch through the base portion and at least one end of the wick extends through the at least one notch.

In at least one example embodiment, the gasket is integrally molded with a connector piece.

In at least one example embodiment, the absorbent material is in fluid communication with the reservoir.

At least one example embodiment relates to a cartridge of an e-vaping device.

In at least one example embodiment, a cartridge of an e-vaping device comprises: a housing extending in a longitudinal direction; a reservoir in the housing, the reservoir configured to store a pre-vapor formulation; an inner tube in the outer housing, the reservoir between an inner surface of the housing and an outer surface of the inner tube, the inner tube defining an air channel therein; a sheath integrally formed with the inner tube, the sheath having an end wall and a lateral wall, the sheath defining a heating chamber therein, the sheath defining an air passage through the end wall, the air passage in fluid communication with the air channel, and the sheath defining a chamber within the lateral wall; a heater in the heating chamber; and an absorbent material surrounding a portion of the elongate portion of the gasket.

In at least one example embodiment, the absorbent material is within a portion of the sheath.

In at least one example embodiment, the heater comprises: a first ring at a first end of the heater, a second ring at a second end of the heater, and a sinusoidal shaped member extending between the first ring and the second ring. The first ring, the sinusoidal shaped member, and the second ring are integrally formed.

In at least one example embodiment, the heater is a coiled heater.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 9 is an enlarged view of a heater in flat form according to at least one example embodiment.

FIG. 10A is an enlarged view of a portion of a heater according to at least one example embodiment.

FIG. 10B is a side view of a portion of a heater according to at least one example embodiment.

DETAILED DESCRIPTION OF EXAMPLE EMBODIMENTS

Figure 1A:
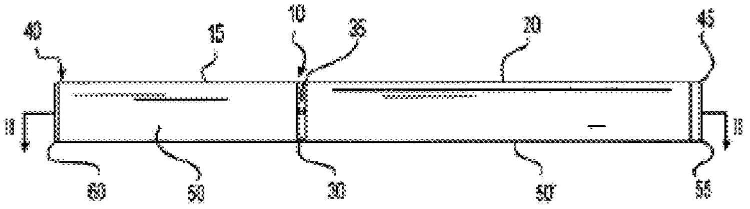
FIG. 1A is a side view of an e-vaping device according to at least one example embodiment.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various example embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1A is a side view of an e-vaping device according to at least one example embodiment.

In at least one example embodiment, as shown in FIG. 1A, an e-vaping device 10 includes a cartridge (or first section) 15 and a battery section (or second section) 20, which are coupled together at a connector 30.

In at least one example embodiment, the cartridge 15 and the battery section 20 each include a housing 50, 50', respectively, extending in a longitudinal direction. The housing 50, 50' has a generally cylindrical cross-section. In at least one example embodiment, the housing 50 and/or the housing 50' may have a generally triangular or square cross-section along one or more of the cartridge 15 and the battery section 20. In at least one example embodiment, the housing 50 and/or the housing 50' may have a greater circumference or dimensions at a first end 40 of the e-vaping device 10 than at a second end 45 of the e-vaping device. The circumference and/or dimensions of the housing 50 may be the same or different than the circumference and/or dimensions of the housing 50'.

In at least one example embodiment, the e-vaping device 10 includes an end cap 55 at the second end 45 of the e-vaping device and a mouth-end insert 60 at the first end 40 of the e-vaping device.

In at least one example embodiment, the connector 30 may be any type of connector, such as a threaded, snug-fit, detent, clamp, bayonet, and/or clasp. At least one air inlet 35 extends through a portion of the connector 30. In other example embodiments, the at least one air inlet 35 may extend through the housing 50, 50'.

In at least one example embodiment, more than two air inlets 35 may be included in the housing 50, 50'. Alternatively, a single air inlet 35 may be included in the housing 50, 50'.

In at least one example embodiment, the at least one air inlet 35 may be formed in the outer housing 50, 50' adjacent the connector 30 so as to minimize and/or reduce the chance of an adult vaper's fingers occluding the air inlet 35 and to control the resistance-to-draw (RTD). In at least one example embodiment, the air inlet 35 may provide a substantially consistent RTD. In at least one example embodiment, the air inlet 35 may be sized and configured such that the e-vaping device 10 has a RTD in the range of from about 30 mm $H_2O$ to about 180 mm $H_2O$ (e.g., about 60 mm $H_2O$ to about 150 mm $H_2O$ or about 80 mm $H_2O$ to about 120 mm $H_2O$).

In at least one example embodiment, the e-vaping device 10 may be about 80 mm to about 140 mm long and about 7 mm to about 15 mm in diameter. For example, in one example embodiment, the e-vaping device may be about 84 mm long and may have a diameter of about 7.8 mm.

In at least one example embodiment, the e-vaping device 10 may include features described in U.S. Patent Application Publication No. 2013/0192623 to Tucker et al. filed Jan. 31, 2013, the entire content of which is incorporated herein by reference thereto.

Figure 1B:
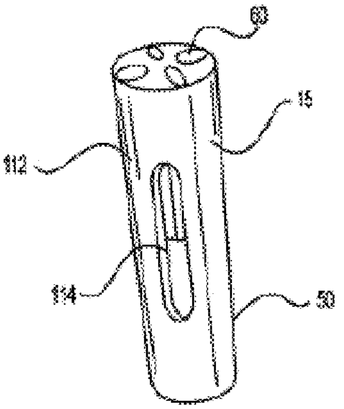
FIG. 1B is a side view of a cartridge of the e-vaping device of FIG. 1A according to at least one example embodiment.

FIG. 1B is a side view of a cartridge of the e-vaping device of FIG. 1A according to at least one example embodiment.

In at least one example embodiment, as shown in FIG. 1B, the housing 50 of the cartridge 15 may be formed of a clear and/or transparent plastic or glass. A wrapper or label 112 may circumscribe at least a portion of the housing 50. The wrapper or label 112 may have a cutout 114 therein. The cutout 114 may overlie a reservoir 5 so that a level of pre-vapor formulation stored in the reservoir 5 may be visually determined. The cutout 114 may be about 2 mm to about 10 mm wide and about 5 mm to about 20 mm in length. The size and/or shape of the cutout 114 may be adjusted depending on a circumference and/or length of the cartridge 15. In addition, the wrapper or label 112 may include markings that indicate a volume of pre-vapor formulation remaining in the reservoir 5 (discussed below).

In at least one example embodiment, the wrapper or label 112 may be a sticker and/or include at least one adhesive. The wrapper or label 112 may be laminated to protect the cartridge 15 against moisture. The wrapper or label 112 may be any color and include indicia printed thereon. The wrapper or label 112 may be smooth or rough.

Figure 2:
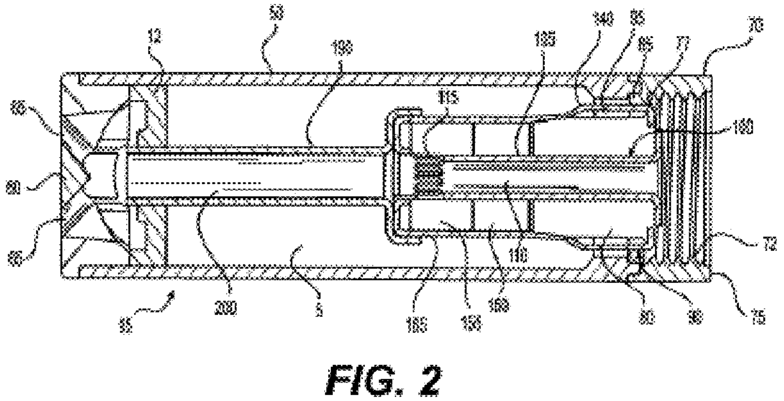
FIG. 2 is a cross-sectional view along line II-II of a cartridge of the e-vaping device of FIG. 1A according to at least one example embodiment.

FIG. 2 is a cross-sectional view along line II-II of a cartridge of the e-vaping device of FIG. 1A according to at least one example embodiment.

In at least one example embodiment, as shown in FIG. 2, the cartridge 15 includes a first connector piece 70 at a second end of the housing 50, and the mouth-end insert 60 in a first end of the housing 50.

In at least one example embodiment, the first connector piece 70 includes a base 75 and a nose portion 80. The base 75 is generally cylindrical in cross-section and may include a threaded section 72 on an inner surface thereof. The threaded section 72 of the first connector piece 70 may be configured to mate with a female connector piece of the battery portion 20 of the e-vaping device (not shown). The base 75 includes a flange 85 defining an orifice extending there through.

In at least one example embodiment, the first connector piece 70 is formed of metal. In other example embodiments, the first connector piece 70 may be formed of plastic. For example, the first connector piece 70 may be formed of plastic and a conductive metal insert 77 may be inserted into the first connector piece 70. The conductive metal insert 77 may be a cathode contact. The conductive metal insert 77 may be generally ring-shaped and may include at least one electrical lead 140 extending longitudinally therefrom, such that the lead 140 extends through slot 90 in the flange 85 of the base 75.

In at least one example embodiment, the first connector piece 70 includes a nose portion 80 at a first end of the connector body 70. The nose portion 80 includes a first sidewall 95 defining a first channel 100 that extends longitudinally through the nose portion 80 so as to form an air passage.

In at least one example embodiment, an electrically conductive post 105 extends through the base 75, the conductive metal insert 77, and the first channel 100 of the nose portion 80 of the first connector piece 70. The post 105 may have a second channel 110 extending longitudinally there through. The second channel 110 may be nested within the first channel 100.

In at least one example embodiment, a heater 115 is supported on the post 105, and forms a first electrical connection via the post 105.

In at least one example embodiment, the base 75 has a larger outer diameter than an outer diameter of the nose portion 80. The first connector piece 70 is substantially T-shaped. In other example embodiments, the first connector piece 70 may have other shapes and/or dimensions.

In at least one example embodiment, the cartridge includes a first absorbent pad 150 and an adjacent second absorbent pad 155 so as to enhance flow of pre-vapor formulation to the heater 115. The first absorbent pad 150 surrounds the post 105 and the second absorbent pad 155 surrounds the post 105 and the heater 115.

In other example embodiments, the cartridge 15 may include a single absorbent pad or more than two absorbent pads. The first and/or second absorbent pads 150, 155 may completely surround the entire post 105 and/or the entire heater 115. In another example embodiment, the first and/or second absorbent pads 150, 155 may partially surround portions of one or more of the post 105 and/or the heater 115. For example, the first and/or second absorbent pads 150, 155 may include cut out portions and/or may extend partially about a circumference of the heater 115. Additional absorbent pads may also be placed adjacent the heater 115 (not shown).

The first absorbent pad 150 is formed of a material that is more conductive to liquid than retentive so that the pre-vapor formulation in the reservoir 5 (discussed below) may flow faster towards the heater 115. The fiber size and density of the material may be chosen to enable a desired flow rate of pre-vapor formulation. The fiber size may range from about 5 microns to about 30 microns (e.g., about 8 microns to about 15 microns). The density or pore volume of the material may range from about 0.08 g/cc to about 0.3 g/cc (e.g., about 0.14 g/cc to about 0.19 g/cc). For example, the first absorbent pad 150 may be formed of polymer fibers, such as a combination of polypropylene (PP) and polyethylene (PE) fibers, a combination of polyethylene terephthalate (PET) and polybutylene terephthalate (PBT) fiber, and/or a combination of PET and PP fibers. For example, the first absorbent pad 150 may be formed of a combination of PET and PP fibers. The fibers may be bonded in such a way that most of the fibers are aligned along the longitudinal direction to facilitate transfer of the pre-vapor formulation.

In at least one example embodiment, the second absorbent pad 155 is a substantially retentive pad made of a material that is more retentive than conductive. The second absorbent pad 155 is closer to the heater 115 than the first absorbent pad 150. In other example embodiments, the first absorbent pad 150 may be closer to the heater 115 than the second absorbent pad 155.

In at least one example embodiment, the second absorbent pad 155 is formed of a material having relatively high temperature stability. The material may include fiber glass material. The thickness of the second absorbent pad 155 may play a role in determining the thermal mass (amount of liquid that needs to be heated to form a vapor). The thickness of the second absorbent pad 155 may range from about 0.3 mm to about 2.0 mm (e.g., about 0.6 mm to about 0.8 mm). The first and second absorbent pads 150, 155 may have a same or different thickness. A length of the first and/or second absorbent pad 150, 155 may range from about 2 mm to about 10 mm (e.g., about 3 mm to about 9 mm or about 4 mm to about 8 mm). The length of the first absorbent pad 150 may be the same or different than the second absorbent pad 155.

The first absorbent pad 150 is at least partially retentive so as to substantially prevent and/or reduce leakage of pre-vapor formulation, while allowing the pre-vapor formulation to travel to the second absorbent pad 155 and the heater 115.

In at least one example embodiment, the material used to form the first absorbent pad 150 is not heat resistant since the first absorbent pad 150 is not in direct contact with the heater 115. In other example embodiments, the material used to form the first absorbent pad 150 is heat resistant.

In at least one example embodiment, the cartridge 10 also includes a sheath 165. The sheath 165 surrounds the first and second absorbent pads 150, 155. In other example embodiments, the sheath 165 may only surround a portion of one or more of the first and second absorbent pads 150, 155.

In at least one example embodiment, the sheath 165 includes an end wall 170 having an outlet 180 therein. The outlet 180 is in fluid communication with the first channel 100 of the post 105. The sheath 165 may be generally cup-shaped and may be sized and configured to fit over the first and second absorbent pads 150, 155 and the heater 115.

In at least one example embodiment, the sheath 165 is formed of a conductive metal. For example, the sheath 165 may be formed of stainless steel. The sheath 165 isolates the heater 115 and the first and second absorbent pads 150, 155 from the reservoir 5 (discussed in more detail below). Any combination of absorbent pads and sheath with different conductivity and/or retention and/or thermal and/or other characteristics may be used based on a desired level of vapor mass, temperature, leakage, immunity, and the like.

In at least one example embodiment, the cartridge 10 also includes an inner tube 190 having an inner tube air passage 200 there through. The inner tube air passage 200 is in fluid communication with the outlet 180 in the sheath 165 and the second channel 110 in the post 105. The inner tube 190 may be formed of a metal or polymer. In at least one example embodiment, the inner tube 190 is formed of stainless steel.

In at least one example embodiment, the housing 50 abuts the base 75 of the first connector piece 70. The housing 50 substantially surrounds the sheath 165 and the inner tube 190.

In at least one example embodiment, the housing 50 is substantially clear. The housing 50 may be made of glass or clear plastic so as to enable an adult vaper to visually determine a level of pre-vapor formulation in the reservoir 5.

In at least one example embodiment, a gasket 12 is between the inner tube 190 and the housing 50. An outer perimeter of the gasket 12 provides a seal with an interior surface of the housing 50.

In at least one example embodiment, the reservoir 5 is established between the inner tube 190, the outer housing 50, the gasket 12, and the base 75 of the first connector piece 70. The reservoir 5 may be filled with pre-vapor formulation via injection through the gasket 12, which may act as a septum.

In at least one example embodiment, the reservoir 5 is sized and configured to hold enough pre-vapor formulation such that the e-vaping device 10 may be configured for vaping for at least about 200 seconds. Moreover, the e-vaping device 10 may be configured to allow each puff to last about 10 seconds or less.

In at least one example embodiment, the pre-vapor formulation may be a material or combination of materials that may be transformed into a vapor. For example, the pre-vapor formulation may be a liquid, solid and/or gel formulation including, but not limited to, water, beads, solvents, active ingredients, ethanol, plant extracts, natural or artificial flavors, and/or vapor formers such as glycerin and propylene glycol.

In at least one example embodiment, the first section 70 may be replaceable. In other words, once the pre-vapor formulation of the cartridge 15 is depleted, the cartridge 15 may be replaced.

In at least one example embodiment, the reservoir 5 may also include a storage medium (not shown) configured to store the pre-vapor formulation therein. The storage medium may include a winding of cotton gauze or other fibrous material about the inner tube 190.

The storage medium may be a fibrous material including at least one of cotton, polyethylene, polyester, rayon and combinations thereof. The fibers may have a diameter ranging in size from about 6 microns to about 15 microns (e.g., about 8 microns to about 12 microns or about 9 microns to about 11 microns). The storage medium may be a sintered, porous or foamed material. Also, the fibers may be sized to be irrespirable and may have a cross-section which has a Y-shape, cross shape, clover shape or any other suitable shape. In an alternative example embodiment, the reservoir 5 may include a filled tank lacking any storage medium and containing only pre-vapor formulation.

In at least one example embodiment, the mouth-end insert 60 is inserted in an end of the housing 50. The mouth-end insert 60 includes at least one outlet 65 extending through an end surface of the mouth-end insert. The outlet 65 is in fluid communication with the inner tube air passage 200 extending through the inner tube 190.

In at least one example embodiment, as shown in FIG. 2, the mouth-end insert 60 includes at least two outlets 65, which may be located off-axis from the longitudinal axis of the e-vaping device 10. The outlets 65 are angled outwardly in relation to the longitudinal axis of the e-vaping device 10. The outlets 65 may be substantially uniformly distributed about the perimeter of the mouth-end insert 60 so as to substantially uniformly distribute vapor.

During vaping, pre-vapor formulation may be transferred from the reservoir 5 and/or storage medium (not shown) to the proximity of the heater 115 via capillary action of the first and second absorbent pads 150, 155. In at least one example embodiment, as shown in FIG. 2, the heater 115 vaporizes pre-vapor formulation, which may be drawn from the reservoir 5 by the first and second absorbent pads 150, 155.

Figure 3:
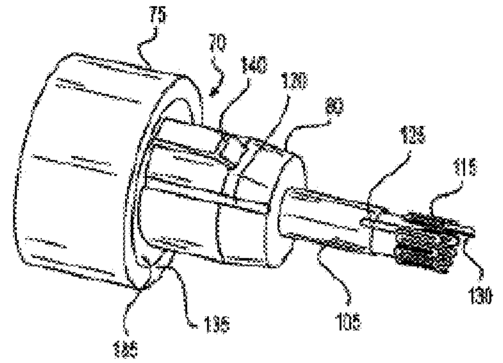
FIG. 3 is a perspective view of a heater assembly of the cartridge of FIG. 2 according to at least one example embodiment.

FIG. 3 is a perspective view of a heater assembly of the cartridge of FIG. 2 according to at least one example embodiment.

In at least one example embodiment, as shown in FIG. 3, the heater assembly includes the first connector piece 70, the post 105, and the heater 115 as shown in FIG. 2. In addition, the first connector piece 70 may include at least one external channel 120 extending along an outer surface of the first sidewall 95. The at least one external channel 120 extends substantially in the longitudinal direction. The at least one external channel 120 is sized and configured to allow a pre-vapor formulation to travel from the reservoir 5, underneath the sheath 165 and to the first and second absorbent pads 150, 155 and the heater 115. In other example embodiments, the at least one external channel 120 may have a tortuous form.

Figure 4:
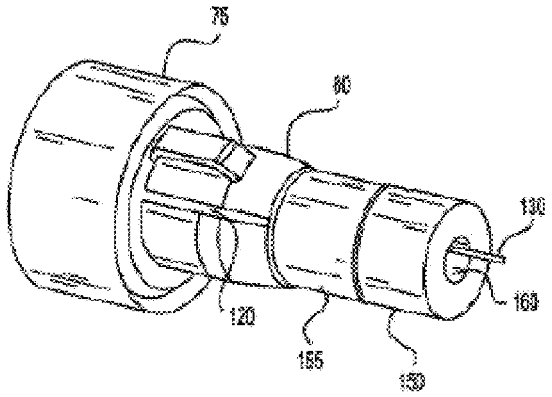
FIG. 4 is a second perspective view of a heater assembly of the cartridge of FIG. 2 according to at least one example embodiment.

FIG. 4 is a second perspective view of a heater assembly of the cartridge of FIG. 2 according to at least one example embodiment.

In at least one example embodiment, as shown in FIG. 4, the heater assembly is the same as in FIG. 3, but is shown with the second heater electrical lead 130 extending from the heater 115 and through an opening in the first absorbent pad 150.

Figure 5:
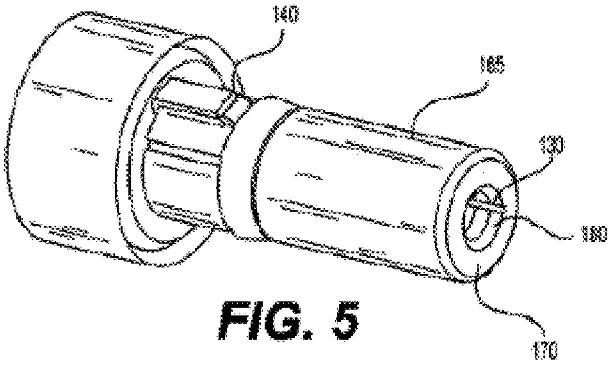
FIG. 5 is a third perspective view of a heater assembly of the cartridge of FIG. 2 according to at least one example embodiment.

FIG. 5 is a third perspective view of a heater assembly of the cartridge of FIG. 2 according to at least one example embodiment.

In at least one example embodiment, as shown in FIG. 5, the heater assembly is the same as in FIGS. 3 and 4, but is shown with the sheath 165 contacting the lead 140 and the second heater electrical lead 130 so as to form a second electrical contact with the heater. As will be recalled, the first heater electrical lead 125 is in contact with the post 105 to form the first electrical contact.

Figure 6:
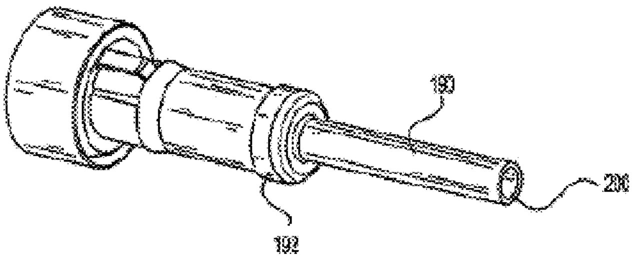
FIG. 6 is a perspective view of a heater assembly and inner tube of the cartridge of FIG. 2 according to at least one example embodiment.

FIG. 6 is a perspective view of a heater assembly and inner tube of the cartridge of FIG. 2 according to at least one example embodiment.

In at least one example embodiment, as shown in FIG. 6, the heater assembly is the same as in FIGS. 3-5, but is shown joined with the inner tube 190. As shown in FIG. 6, the inner tube 190 includes an inner tube base portion 192 that substantially surrounds the sheath 165 at a first end thereof. The inner tube base portion 192 may be sized and configured, such that the sheath 165 is held within the inner tube base portion 192 by friction fit. In other example embodiments, the inner tube base portion 192 may fit over the sheath 165 with threads, by snap-fit, or any other suitable connection.

In an example embodiment, the inner tube 190 has an inner diameter ranging from about 2 mm to about 6 mm (e.g., about 4 mm). The inner tube 190 defines the inner tube air passage 200 there through. The inner tube air passage 200 is in fluid communication with the second channel 110 through the post 105.

Figure 7:
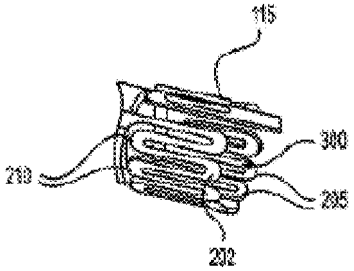
FIG. 7 is an enlarged view of a heater of the cartridge of FIG. 2 according to at least one example embodiment.

FIG. 7 is an enlarged view of a heater of the cartridge of FIG. 2 according to at least one example embodiment.

In at least one example embodiment, as shown in FIG. 7, the heater is the same as in FIGS. 2-3, but is shown in greater detail. As shown, the heater 115 includes a plurality of lobes 202. The heater 115 may include a first set 205 of lobes 202 and a second set 210 of lobes 202, such that the heater 115 has a generally serpentine or sinuous shape along a circumference thereof. The heater 115 may be formed by stamping a flat metal sheet, such as a sheet of stainless steel to form the generally serpentine or sinuous shape. The lobes 202 may be generally flat. The heater 115 is curled and/or rolled to form a generally tubular and/or elliptical (e.g., circular) heater. Once curled and/or rolled, the heater 115 defines a first air passage 300 extending longitudinally through the heater 115. The first set 205 of lobes 202 may be closer to the first end 40 of the cartridge 15 than the second set 210 of lobes 202. Thus, the heater 115 may extend substantially parallel to the longitudinal axis of the cartridge 15 and/or e-vaping device 10. The first air passage 300 is in fluid communication with the second channel 110 and the inner tube air passage 200. In at t least one example embodiment, the heater 115 may be formed by laser cutting, photochemical etching, electrochemical milling, etc. The heater 115 may be formed of a nickel-chromium alloy or a nickel-chromium-iron alloy.

In at least one example embodiment, the heater 115 may be formed of any suitable electrically resistive materials. Examples of suitable electrically resistive materials may include, but not limited to, titanium, zirconium, tantalum and metals from the platinum group. Examples of suitable metal alloys include, but not limited to, stainless steel, nickel, cobalt, chromium, aluminum-titanium-zirconium, hafnium, niobium, molybdenum, tantalum, tungsten, tin, gallium, manganese and iron-containing alloys, and super-alloys based on nickel, iron, cobalt, stainless steel. For example, the heater 115 may be formed of nickel aluminide, a material with a layer of alumina on the surface, iron aluminide and other composite materials, the electrically resistive material may optionally be embedded in, encapsulated or coated with an insulating material or vice-versa, depending on the kinetics of energy transfer and the external physicochemical properties required. The heater 115 may have burrs completely removed via electrochemical etching. The heater 115 may include at least one material selected from the group consisting of stainless steel, copper, copper alloys, nickel-chromium alloys, super alloys and combinations thereof. In at least one example embodiment, the heater 115 may be formed of nickel-chromium alloys or iron-chromium alloys. In another example embodiment, the heater 115 may be a ceramic heater having an electrically resistive layer on an outside surface thereof. The heater 115 may have a resistance of about 3.1 ohms to about 3.5 ohms (e.g., about 3.2 ohms to about 3.4 ohms).

When activated, the heater 115 heats a portion of the second absorbent pad 155 surrounding the heater 115 for less than about 15 seconds. Thus, the power cycle (or maximum puff length) may range in period from about 2 seconds to about 12 seconds (e.g., about 3 seconds to about 10 seconds, about 4 seconds to about 8 seconds or about 5 seconds to about 7 seconds).

Because the heater 115 extends parallel to the longitudinal direction and is generally serpentine in shape, a greater amount of surface area of the second absorbent pad 155 is covered as compared to a wire or wire coil heater.

Moreover, since the first air passage 300 extending through the heater 115 is parallel to longitudinal direction and the second absorbent pad 155 substantially surrounds the heater 115, the vapor flows to the first air passage 300 as it is formed without any portion of the cartridge 15 blocking flow of the vapor from the heater 115.

Figure 8:
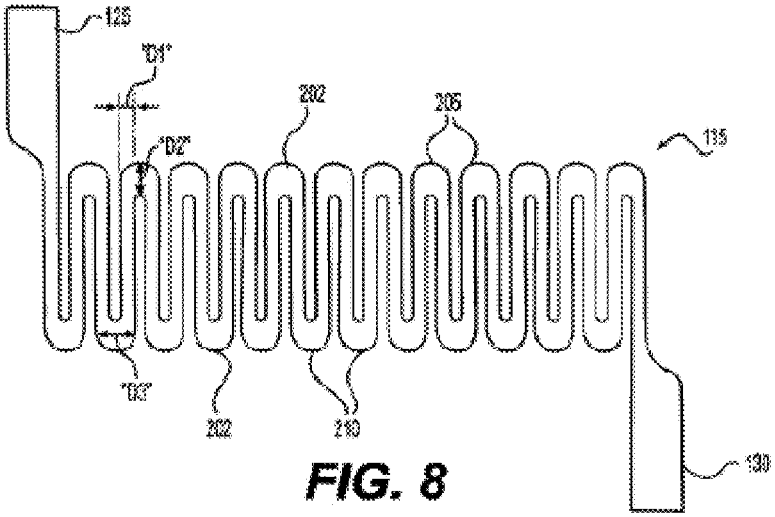
FIG. 8 is an enlarged view of the heater of FIG. 7 in flat form according to at least one example embodiment.

FIG. 8 is an enlarged view of the heater of FIG. 7 in flat form according to at least one example embodiment.

In at least one example embodiment, as shown in FIG. 7, the heater 115 is the same as in FIGS. 2, 3, and 7, but is shown with the first electrical lead 125 and a second electrical lead 130. The first electrical lead 125 and the second electrical lead 130 may be wider than portions of the heater 115 forming the lobes 202. For example, the first electrical lead 125 and the second electrical lead 130 may have a width ranging from about 0.25 mm to about 1.0 mm (e.g., about 0.3 mm to about 0.9 mm or about 0.4 mm to about 0.7 mm. For example, the width of the leads 125, 130 may be about 0.5 mm.

In addition, the heater 115 is designed to control the resistance distribution across the heater's geometry. A width D2 of the lobes 202 is wider than a width D1 of vertical portions of the heater 115. As a result, the electrical resistance of the lobes 202 is lower, such that the lobes 202 get less hot than vertical portions of the heater 115 thereby allowing for most of the heat to be across the vertical portions of the heater 115. The width D1 may range from about 0.1 mm to about 0.3 mm (e.g., about 0.15 mm to about 0.25 mm). For example, the width D1 may be about 0.13 mm A width D3 of each lobe 202 may range from about 0.2 mm to about 0.4 mm.

FIG. 9 is an enlarged view of a heater in flat form according to at least one example embodiment.

In at least one example embodiment, the heater 115 may have other designs that also allow for controlled resistance distribution. For example, in at least one example embodiment, the heater 115 may include lobes and transverse portions forming arrow shapes in lieu of a sinusoidal shape. In at least one example embodiment, a central portion 132 between opposing lobes may form an apex that is not in line with the lobes. The apex may be at an angle of about 10 degrees to about 90 degrees from each of the opposing lobes. For example, the lobes and the central portion 143 may form a generally triangular shape. A distance between adjacent central portions 132 and/or lobes may be substantially uniform. In other example embodiments, the distance between the adjacent central portions 132 and/or lobes may vary along the heater 115. The distance between adjacent central portions 132 and/or lobes may range from about 0.05 mm to about 1.0 mm (e.g., about 0.1 mm to about 0.9 mm, about 0.2 mm to about 0.8 mm, about 0.7 mm to about 0.6 mm, or about 0.4 mm to about 0.5 mm). For example, the distance between adjacent central portions may be about 0.09 mm.

FIG. 10A is an enlarged view of a portion of a heater according to at least one example embodiment.

In at least one example embodiment, as shown in FIG. 10A, the heater 115 is the same as in FIGS. 2, 3, 7, and 8, but also includes tabs 215.

FIG. 10B is a side view of a portion of a heater according to at least one example embodiment.

In at least one example embodiment, as shown in FIG. 10B, the tabs 215 may be folded outwardly from the first air passage 300. The tabs 215 may create a tighter contact between the heater 115 and the second absorbent pad 155, and/or may increase a contact surface area between the heater 115 and the second absorbent pad 155.

Figure 11:
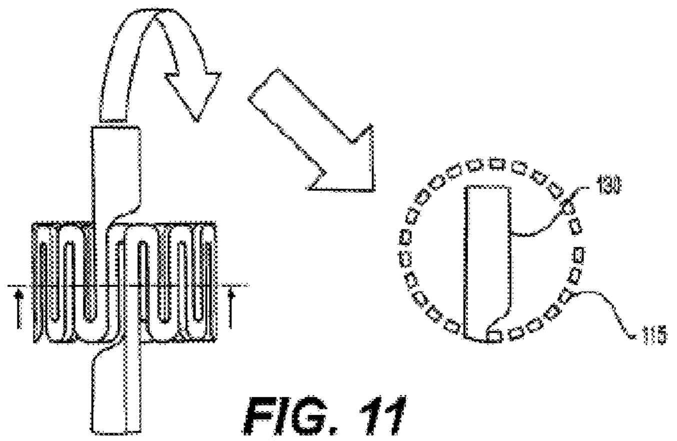
FIG. 11 is an illustration of a heater and an electrical lead according to at least one example embodiment.

FIG. 11 is an illustration of a heater and an electrical lead according to at least one example embodiment.

In at least one example embodiment, as shown in FIG. 11, the heater 115 is the same as in FIGS. 2, 3, 7, and 8, but may have the second electrical lead 130 bent inwardly within the first air passage 300. The second electrical lead 130 may direct the air flow through the first air passage 300 and affect the RTD in a desired manner. In at least one example embodiment, the second electrical lead 130 may be cut in half (not shown), with one half extending inwardly as shown in FIG. 11, and with each half contacting a separate portion of the sheath 165 to establish electrical communication between the heater 115 and the power supply 225 (shown in FIG. 13).

Figure 12:
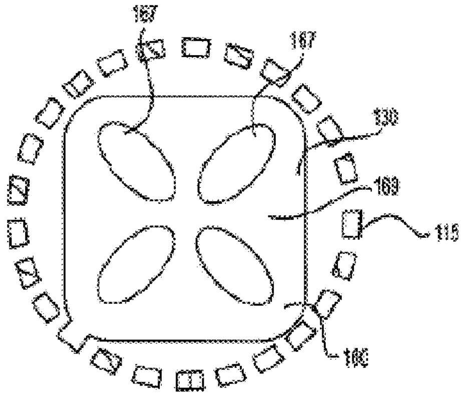
FIG. 12 is an illustration of a heater and an electrical lead according to at least one example embodiment.

FIG. 12 is an illustration of a heater and an electrical lead according to at least one example embodiment.

In at least one example embodiment, as shown in FIG. 12, the second electrical lead 130 may include an end surface 160 defining a plurality of orifices 167 therein. The orifices 167 may alter the air flow through the cartridge 15 and may adjust the RTD of the e-vaping device 10.

Figure 13:
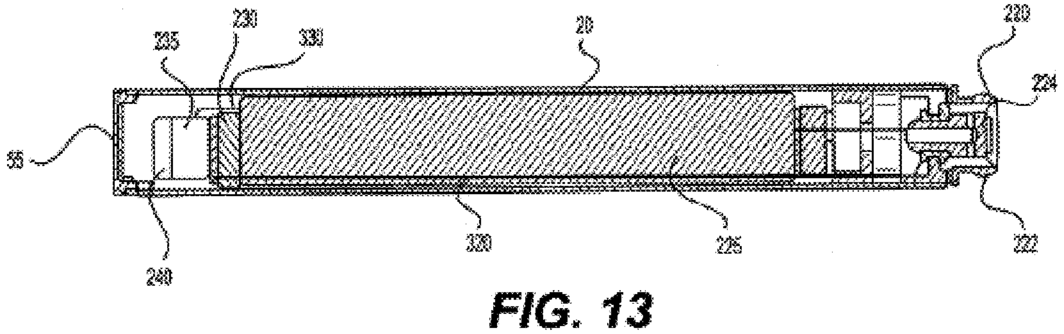
FIG. 13 is an illustration of a battery section of the e-vaping device of FIG. 2 according to at least one example embodiment.

FIG. 13 is an illustration of a battery section of the e-vaping device of FIG. 2 according to at least one example embodiment.

In at least one example embodiment, as shown in FIG. 13, the second section 20 includes a second connector piece 220, a sensor 230 responsive to air drawn into the second section 20 via an air inlet port 35 (shown in FIG. 1), the power supply 225, a control circuit 235, a light 240, and the end cap 55. The second connector piece 220 is configured to connect with the first connector piece 70 of the cartridge 15 (shown in FIG. 2).

In at least one example embodiment, the connector 220 may include a male threaded section 222 and an inner contact 224, which contact the conductive metal insert 77 and the post 105, respectively, of the cartridge 15. The male threaded section 222 is insulated from the inner contact 224. Thus, the male threaded section 222 contacts the conductive metal insert 77, which includes the leads 140 that contact the sheath 165, and the sheath 165 contacts the second electrical lead 130 of the heater 115. The inner contact 224 contacts the post 105, which contacts the first electrical lead 125 of the heater 115.

In at least on example embodiment, a first terminal of the power supply 225 connects to the post 105 and a second terminal of the power supply 225 connects to the control circuit 235 via lead 330. The control circuit 235 connects to the sensor 230 and to the conductive metal insert 77 via lead wire 320.

In at least one example embodiment, the power supply 225 may include a battery arranged in the e-vaping device 10. The power supply 225 may include a Lithium-ion battery or one of its variants, for example a Lithium-ion polymer battery. Alternatively, the power supply 225 may include a nickel-metal hydride battery, a nickel cadmium battery, a lithium-manganese battery, a lithium-cobalt battery or a fuel cell. The e-vaping device 10 may be vapable by an adult vaper until the energy in the power supply 225 is depleted or in the case of lithium polymer battery, a minimum voltage cut-off level is achieved.

In at least one example embodiment, the power supply 225 may include a battery and circuitry configured to shape a waveform of power applied to the heater so that the output of the battery cell may be attenuated, "chopped," etc. before the power is applied to the heater.

In at least one example embodiment, the power supply 225 may be rechargeable. The second section 20 may include circuitry configured to allow the battery to be chargeable by an external charging device. To recharge the e-vaping device 10, an USB charger or other suitable charger assembly may be used.

In at least one example embodiment, the sensor 230 is configured to generate an output indicative of a magnitude and direction of airflow in the e-vaping device 10. The control circuit 235 receives the output of the sensor 230, and determines if (1) the direction of the airflow indicates a draw on the mouth-end insert 60 (versus blowing) and (2) the magnitude of the draw exceeds a threshold level. If these conditions are met, the control circuit 235 electrically connects the power supply 225 to the heater 115. In an alternative embodiment, the sensor 230 may indicate a pressure drop, and the control circuit 235 activates the heater 115 in response thereto.

In at least one example embodiment, the control circuit 235 may also include a light 240 configured to glow when the heater 115 is activated and/or the battery is being recharged. The heater activation light 240 may include an LED. Moreover, the heater activation light 240 may be arranged to be visible to an adult vaper during vaping. In addition, the heater activation light 240 may be utilized for e-vaping system diagnostics or to indicate that recharging is in progress. The heater activation light 240 may also be configured such that the adult vaper may activate and/or deactivate the heater activation light 240 for privacy. The heater activation light 240 may be on a second end 45 of the e-vaping device 10 or along a side of the housing 50, 50'.

In at least one example embodiment, the control circuit 235 may include a maximum, time-period limiter. In another example embodiment, the control circuit 235 may include a manually operable switch for an adult vaper to activate the e-vaping device 10. The time-period of the electric current supply to the heater 115 may be pre-set depending on the amount of pre-vapor formulation desired to be vaporized. In yet another example embodiment, the control circuit 235 may supply power to the heater 115 as long heater activation conditions are met.

In at least one example embodiment, upon completing the connection between the cartridge 15 and the second section 20, the power supply 225 may be electrically connectable with the heater 115 of the cartridge 15. Air is drawn primarily into the cartridge 15 through the at least one air inlet 35, which may be located along the housing 50, 50' or at the connector 30 (as shown in FIG. 1).

Figure 14:
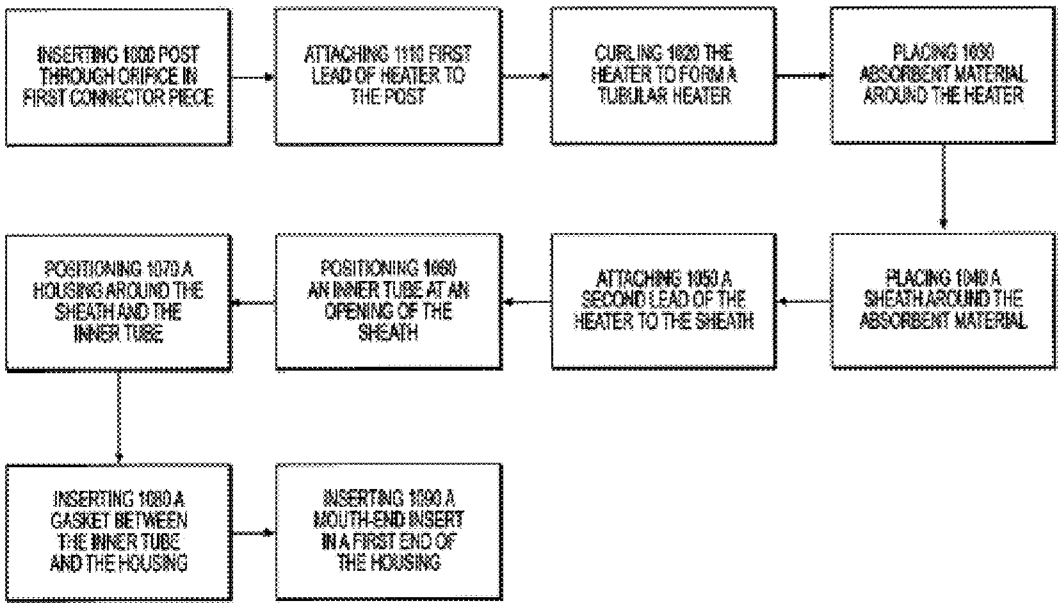
FIG. 14 is a flowchart illustrating a method of forming the cartridge of FIG. 2 according to at least one example embodiment.

FIG. 14 is a flowchart illustrating a method of forming the cartridge of FIG. 2 according to at least one example embodiment.

In at least one example embodiment, as shown in FIG. 14, a method of manufacturing the cartridge of FIG. 2 includes inserting 1000 a post through an orifice in a connector body, attaching 1010 a first lead of a heater to the post, curling 1020 the heater to form a substantially tubular heater, placing 1030 an absorbent material around the heater, placing 1040 a sheath around the absorbent material, and attaching 1050 a second lead of the heater to the sheath. The attaching 1010 may include welding and/or crimping of the first lead to the post. The attaching 1050 may include welding and/or crimping of the second lead to the sheath. In another example embodiment, the curling step 1020 may precede the attaching step 1010.

In at least one example embodiment, the method may include positioning 1060 an inner tube at an opening in the sheath, and positioning 1070 an outer housing around the sheath and the inner tube. The positioning may include friction fitting the housing with the first connector piece.

In at least one example embodiment, the method may also include inserting 1080 a gasket between the inner tube and the outer tube so as to establish a reservoir between the first connector piece, the inner tube, the outer housing, and the gasket.

In at least one example embodiment, the method may also include inserting 1090 a mouth-end insert in a first end of the outer housing.

Figure 15:
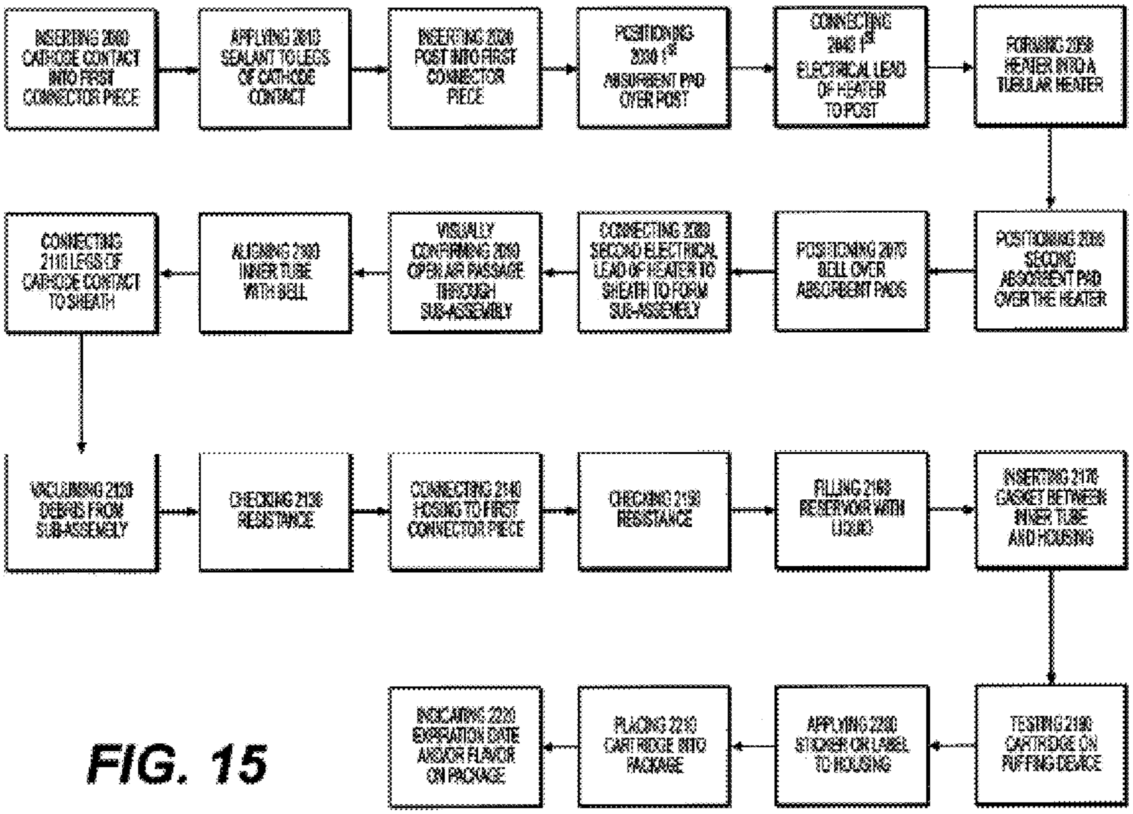
FIG. 15 is a flowchart illustrating a method of forming the cartridge of FIG. 2 according to at least one example embodiment.

FIG. 15 is a flowchart illustrating a method of forming the cartridge of FIG. 2 according to at least one example embodiment.

In at least one example embodiment, as shown in FIG. 15, the method may include inserting 2000 a cathode contact (conductive metal insert 77) into a connector piece 70, applying 2010 a sealant to leads of the conductive metal insert 77, inserting 2020 the post 105 into the first connector piece 70, sliding 2030 the first absorbent pads 150 over a first end of the post 105, attaching the first electrical lead 125 of the heater 115 to the post 105, and rolling and/or curling the heater 115 to form a substantially tubular heater 115. Opposing portions of the tubular heater 115 may be spaced about 0.05 mm to about 0.25 mm apart (e.g., about 0.1 mm to about 0.2 mm). For example, opposing portions of the tubular heater 115 may be about 0.17 mm apart. In other example embodiments, the opposing portions may be in direct physical contact.

In at least one example embodiment, the method may also include wrapping 2060 a second absorbent pad 150 around the heater 115, sliding 2080 a sheath 165 over the first and second absorbent pads 150, 155, attaching the second electrical lead 130 of the heater 115 to the sheath 165, and visually confirming 2090 the outlet 160 is open.

In at least one example embodiment, the method may also include press-fitting 2400 the inner tube 190 onto the sheath 165, connecting 2110 the leads 140 of the conductive metal insert 77 to the sheath 165, and vacuuming 2120 any debris from the subassembly. The connecting 2110 may include spot welding.

In at least one example embodiment, the method may also include checking 2130 resistance of the subassembly, connecting 2140 the barrel to the connector base, and checking 2150 resistance of the assembly. The connecting 2140 may include ultrasonic welding.

In at least one example embodiment, the method may also include filling 2160 the reservoir 5 with the pre-vapor formulation, inserting 2170 the gasket 12 into the housing 50, inserting 2180 the mouth-end insert 60 into the housing 50, and testing 2190 the cartridge 15 on a puffing device.

In at least one example embodiment, the method may further include applying 2200 a sticker to an outside surface of the housing 50, placing 2210 the cartridge 15 into a package, and/or indicating 2220 an expiration date and/or flavor of the pre-vapor formulation on the package. The package may be a foil pouch. The foil pouch may be heat sealed and/or substantially air tight. The indicating 2220 may include laser etching or printing.

In at least one example embodiment, the cartridge described herein allows for automated manufacture because of the reduced number of parts, lack of heater coil to be wound, and the use of snap-fit and/or pressure fit parts.

In at least one example embodiment, the cartridge may be made with molded and/or plastic connectors. In at least one example embodiment, any metal parts may be made by machining, deep drawing, etc.

In at least one example embodiment, the heater may be moved closer to the channels extending under the sheath so as to shorten a distance the pre-vapor formulation must travel to reach the heater. In at least one example embodiment, the absorbent material thickness may be reduced to reduce thermal mass. In at least one example embodiment, circulation may be increased and/or improved by positioning a fin or disperser structure in a center of the air channel, such that high velocity air is forced to flow near a wall of the air channel and/or pass over the heater.

Figure 16:
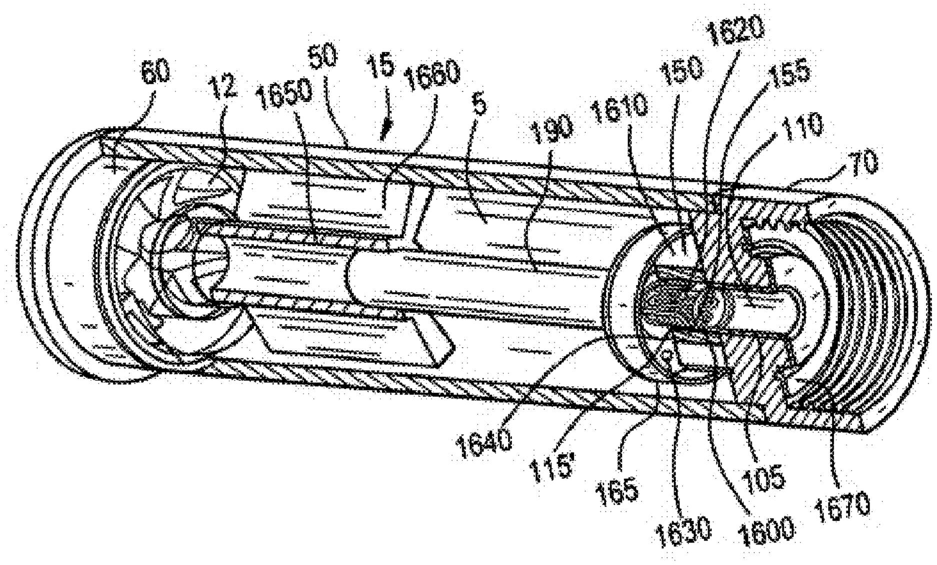
FIG. 16 is a perspective and partial cross-sectional view of a cartridge according to at least one example embodiment.

FIG. 16 is a perspective and partial cross-sectional view of a cartridge according to at least one example embodiment.

In at least one example embodiment, as shown in FIG. 16, the cartridge 15 is the same as in FIGS. 2-6, except that sheath 165 is integrally formed with the inner tube 190, the cartridge 15 includes a support tube 1650, the heater 115' is formed from a tube, and the first and second absorbent pads 150, 155 are concentrically arranged. In addition, instead of the conductive metal insert 77, a cylindrical member 1670 extends through the first connector piece 70 and contacts the sheath 165 as further described below.

As shown in FIG. 16, the heater 115' includes a first end ring 1600 and a second end ring 1610. A sinusoidal shaped member 1620 extends between the first end ring 1600 and the second end ring 1610. The heater 115' may be formed by etching and/or laser cutting the sinusoidal shaped member 1620 into a tube, and the sinusoidal shaped member 1620 may have a substantially same shape as the heater 115 of FIG. 2.

In at least one example embodiment, the sheath 165 is integrally formed with the inner tube 190. The sheath 165 has an end wall 1640 defining at least one weep hole 1630 therein. Thus, the example embodiment of FIG. 16 does not include the external channels 120 through which the pre-vapor formulation flows, as shown in FIGS. 3-4. Instead, the pre-vapor formulation flows from the reservoir 5, through the at least one weep hole 1630 and to the first and second absorbent pads 150, 155. The size and number of weep holes 1630 may be adjusted to substantially control flow of the pre-vapor formulation therethrough.

In at least one example embodiment, as shown in FIG. 16, the support tube 1650 is concentrically arranged in the housing 50. Fins 1660 maintain the support tube 1650 in position within the housing 50. In at least one example embodiment, the support tube 1650 and the fins 1660 are integrally formed with the housing 50. In other example embodiment, the support tube 1650 and the fins 1660 are inserted into the housing 50. The support tube 1650 has an end that abuts and/or mates with a first end of the inner tube 190.

In at least one example embodiment, the first ring 1600 of the heater 115' contacts and/or engages a portion of the integrally formed inner tube 190 and sheath 165. The second ring 1610 contacts and/or is inserted into a first end of the conductive post 105 that extends through the first connector piece 70. The cylindrical member 1670 also extends through the first connector piece 70 and is electrically insulated from the conductive post by a portion of the connector piece 70. The cylindrical member 1670 contacts the sheath 165. At least a portion of the cylindrical member 1670 and at least a portion of the sheath 165 surround the absorbent members 150, 155. Thus, a first end of the heater 115' is electrically connected to the battery section 20 via the sheath 165 and the cylindrical member 1670, while a second end of the heater 115' is electrically connected to the battery section 20 via the conductive post 105.

Figure 17:
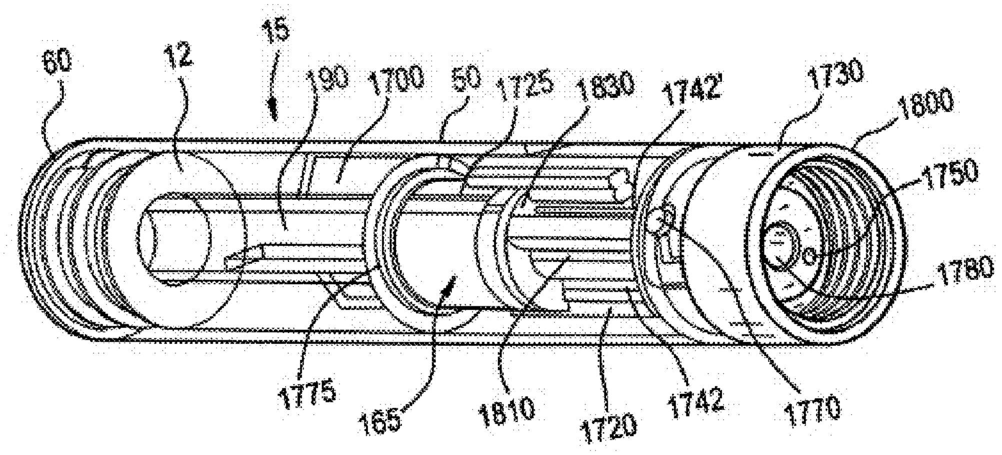
FIG. 17 is a perspective view of a cartridge according to at least one example embodiment.

FIG. 17 is a perspective view of a cartridge according to at least one example embodiment.

In at least one example embodiment, as shown in FIG. 17, the cartridge 15 is the same as the cartridge of FIG. 2 except that the cartridge 15 includes a wick 1720 extending through outlets 1725 defined in a sidewall of the sheath 165, and the cartridge 15 includes a connector 1730 including a base portion 1800 and an extension 1810 that abuts and/or is connected to the sheath 165.

In at least one example embodiment, as shown in FIG. 17, the inner tube 190 can include a plurality of fins 1700 that may be integrally formed with the inner tube 190. The plurality of fins 1700 maintain the inner tube 190 in position within the housing 50 of the cartridge 15. In other example embodiments, the fins 1700, and optionally the inner tube 190, may be integrally formed with the housing 50.

In at least one example embodiment, a gasket 1775 is arranged between a portion of the sheath 165. The gasket 1775 may create a pressure point about the sheath 165, which holds the sheath 165 in place against and/or within the inner tube 190 and/or provides a seal between the sheath 165 and the inner tube 190 if the sheath 165 and the inner tube 190 are not integrally formed. The gasket 1775 may be a silicone disk or ring.

In at least one example embodiment, as shown in FIG. 17, the sheath 165 abuts and/or extends around a gasket portion 1830 of the extension 1810 of the connector piece 1730. The gasket portion 1830 has a generally cylindrical cross-section, and the connector piece 1730 has a barbell or "I" shape. The gasket portion 1830 has a larger diameter than a central portion of the extension 1810. The gasket portion 1830 seals a second end of the sheath 165, such that the pre-vapor formulation cannot enter an interior area of the sheath 165.

In at least one example embodiment, the connector piece 1730 also includes a base 1800 having internal threads. In other example embodiments, the base 1800 may have external threads. The base 1800 and the extension 1810 define an air channel 1780 therethrough. The air channel 1780 is in fluid communication with the air channel in the inner tube 190 via the sheath 165.

In at least one example embodiment, the base 1800 further defines channels 1750 through which electrical leads extend. The channels 1750 extend through the gasket portion 1830. The electrical leads 1742, 1742' are attached to ends of the heater and to the battery section 20 to form the electrical connection between the heater and the power supply. As shown in FIG. 17, the electrical leads 1742, 1742' extend along an outer surface of the extension 1810 and through the channels 1750 in the gasket portion 1830 and the base 1800. In other example embodiments, electrical leads may be in-molded through the connector piece 1730 as set forth in U.S. patent application Ser. No. 15/349,377 to Patil et al., filed Nov. 11, 2016, the entire content of which is incorporated herein by reference thereto.

In at least one example embodiment, as shown in FIG. 17, the housing 50 includes a groove 1740 therein that is configured to secure a slide 1770 therein. The groove 1740 may be generally "L" shaped, though the groove 1740 may be any other suitable shape. The slide 1770 is formed on an outer surface of the connector piece 1730. The slide 1770 and the groove 1740 cooperate to secure the connector piece 1730 to the housing 50. The slide 1770 is aligned with an opening in the groove 1740 and then the connector piece 1730 is rotated to lock the slide 1770 within the groove 1740.

Figure 18:
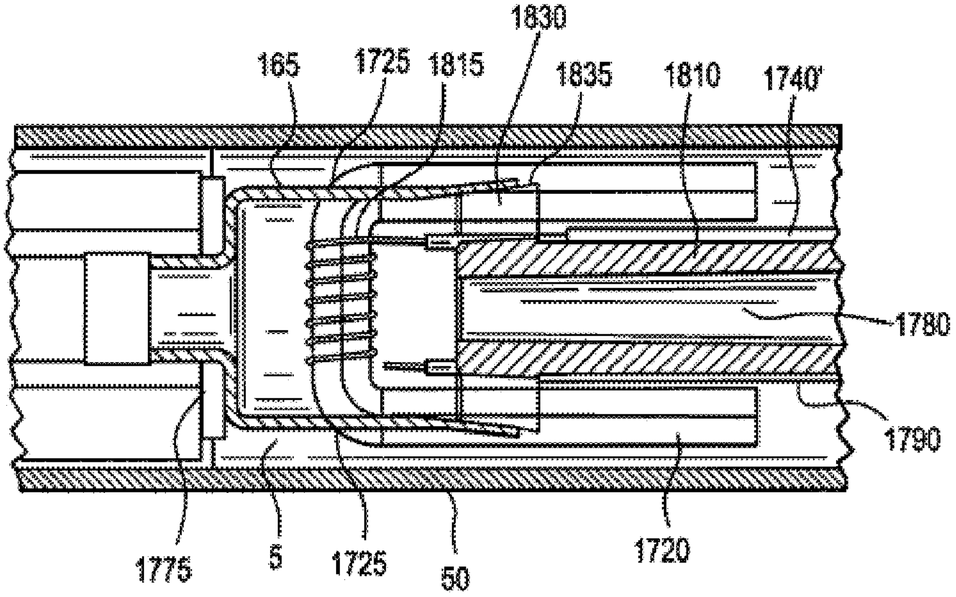
FIG. 18 is a cross-sectional view of a portion of the cartridge of FIG. 17 according to at least one example embodiment.

FIG. 18 is a cross-sectional, enlarged view of a portion of the cartridge of FIG. 17 according to at least one example embodiment.

In at least one example embodiment, as shown in FIG. 18, the heater 1815 may be a heater coil that surrounds a portion of the wick 1720. Ends of the wick 1720 extend into the reservoir 5 via the outlets 1725 defined in a sidewall of the sheath 165. The extension 1810 of the connector piece includes the gasket portion 1830 that has an outer surface 1835 and a generally frustoconical shape. The outer surface 1835 of the gasket portion 1830 is sized and configured to snugly fit within a portion of the sheath 165 so as to substantially seal an end of the sheath 165 and/or substantially prevent the pre-vapor formulation from entering the sheath 165 except via the wick 1720.

The heater 1815 and wick 1720 may be formed as set forth in in U.S. Patent Application Publication No. 2013/0192623 to Tucker et al. filed Jan. 31, 2013 and/or features set forth in U.S. patent application Ser. No. 15/135,930 to Holtz et al. filed Apr. 22, 2016, the entire contents of each of which are incorporated herein by reference thereto. In other example embodiments, the e-vaping device may include the features set forth in U.S. patent application Ser. No. 15/135,923 filed Apr. 22, 2016, and/or U.S. Pat. No. 9,289,014 issued Mar. 22, 2016, the entire contents of each of which is incorporated herein by this reference thereto.

Figure 19:
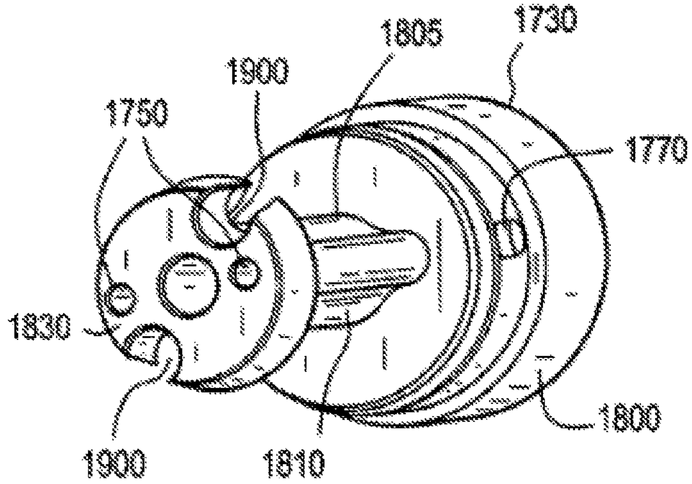
FIG. 19 is a perspective view of a first end of a connector according to at least one example embodiment.

FIG. 19 is a perspective view of a first end of a connector according to at least one example embodiment.

In at least one example embodiment, as shown in FIG. 19, the connector piece 1730 includes the base 1800 and the extension 1810. The extension 1810 includes the gasket portion 1830 and a central portion 1805. The channel 1750 extends through the base 1800, the extension 1810, and the gasket portion 1830 of the connector piece 1730. The connector piece 1730 further includes notches 1900 in the gasket portion 1830 that are sized and configured to hold ends of the wick 1720. The notches 1900 may be on opposing sides of the connector piece 1730.

Figure 20:
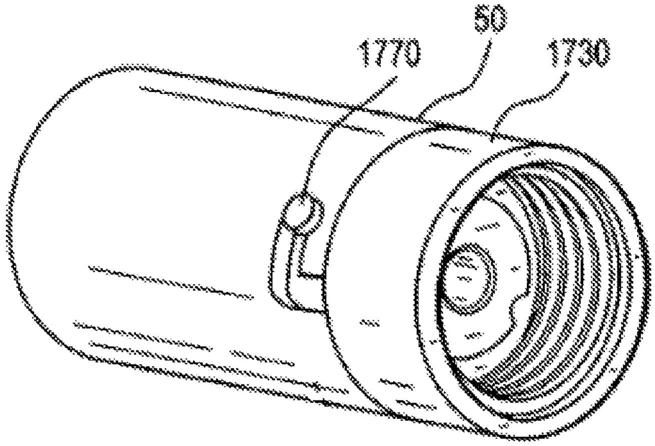
FIG. 20 is a perspective view of a second end of the connector of FIG. 19 according to at least one example embodiment.

FIG. 20 is a perspective view of a second end of the connector of FIG. 19 according to at least one example embodiment.

In at least one example embodiment, as shown in FIG. 20, the connector piece 1730 has an outer surface having a same outer diameter as the housing 50. The connector piece 1730 may be molded of any suitable polymer.

Figure 21:
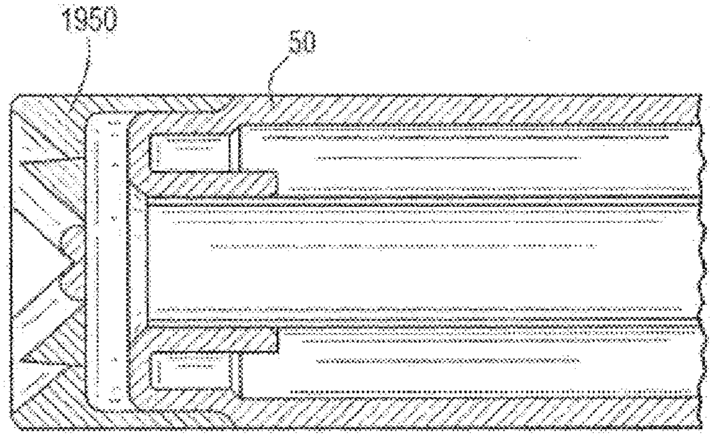
FIG. 21 is a cross-sectional view of a mouthpiece according to at least one example embodiment.

FIG. 21 is a cross-sectional view of a mouthpiece according to at least one example embodiment.

In at least one example embodiment, as shown in FIG. 21, the cartridge 15 may be the same as in FIG. 2, but instead of a mouth-end insert, the cartridge includes a mouthpiece 1950 that surrounds an end portion of the housing 50. The housing 50 and an inner surface of the mouthpiece 1950 may be sized and configured to form a friction fit therebetween. In other example embodiments, the housing 50 and the mouthpiece 1950 may be adhered or fastened together via threads, glue, and/or other suitable fasteners.

Figure 22:
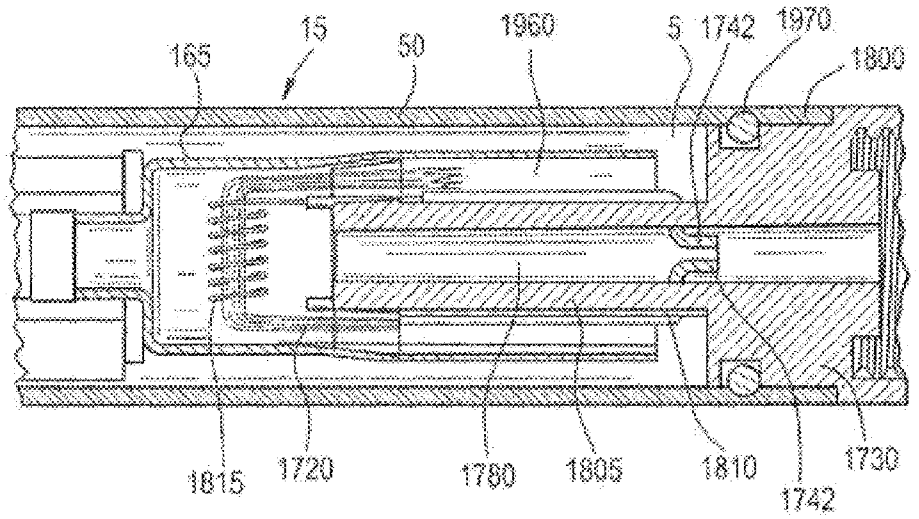
FIG. 22 is a cross-sectional view of a portion of a cartridge according to at least one example embodiment.

FIG. 22 is a cross-sectional view of a portion of a cartridge according to at least one example embodiment.

In at least one example embodiment, as shown in FIG. 22, the cartridge 15 is the same as in FIG. 17, except that the sheath 165 extends over the central portion 1805 of the extension 1810 of the connector piece 1730 and an absorbent material 1960 is positioned between an inner wall of the sheath 165 and an outer surface of the connector piece 1730. In addition, the electrical leads 1742, 1742' extend through a sidewall of the central portion 1805 of the connector piece 1730, into the air channel 1780, and to the battery section (not shown).

In at least one example embodiment, the absorbent material 1960 is a high density absorbent material that is configured to transfer the pre-vapor formulation from the reservoir 5 to the wick 1720.

In at least one example embodiment, the cartridge 15 also includes a seal 1970, such as an O-ring, between an inner surface of the housing 50 and an outer surface of the base 1800 of the connector piece 1730.

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

We claim:

1. A vaporizing device comprising:

a housing extending in a longitudinal direction, the housing defining a groove therein;

a reservoir in the housing;

a vaporizer in the housing;

a connector piece including, a base, an extension extending from the base, a gasket portion, and the base, the extension, and the gasket portion being a single piece, and a slide on an outer surface of the connector piece, the slide configured to engage the groove of the housing so as to secure the connector piece to the housing;

an absorbent material in contact with a portion of the vaporizer;

a sheath at least partially surrounding the absorbent material; and a power supply configured to supply power to the vaporizer.

2. The vaporizing device of claim 1, wherein the sheath is formed of an electrically conductive material.

3. The vaporizing device of claim 1, wherein the gasket portion is friction fitted within a lateral wall of the sheath.

4. The vaporizing device of claim 1, wherein the absorbent material comprises a hollow, cylinder of absorbent material.

5. The vaporizing device of claim 1, wherein the absorbent material comprises glass fiber.

6. The vaporizing device of claim 1, wherein the absorbent material is in fluid communication with the reservoir.

7. The vaporizing device of claim 1, wherein the gasket portion defines channels configured to receive electrical leads, the vaporizer includes a heater coil, and the electrical leads connect to ends of the heater coil.

8. The vaporizing device of claim 1, further comprising:

a mouthpiece configured to fit over a first end of the housing, the mouthpiece including at least one outlet.

9. The vaporizing device of claim 1, wherein the gasket portion, the extension, and the base define at least one flow passage therethrough.

10. The vaporizing device of claim 1, wherein the vaporizer includes a heater and a wick.

11. The vaporizing device of claim 10, wherein the wick is in contact with the absorbent material.

* * * * *